United States Patent [19]

Skoglun

[11] Patent Number: 5,597,137
[45] Date of Patent: Jan. 28, 1997

[54] VERTICAL TAKE-OFF AND LANDING AIRCRAFT

[76] Inventor: Willard Skoglun, 200 Airport Way - M, E. Wenatchee, Wash. 98802

[21] Appl. No.: 365,546

[22] Filed: Dec. 28, 1994

[51] Int. Cl.⁶ .................................. B64C 39/10
[52] U.S. Cl. ................... 244/12.4; 244/12.6; 244/66
[58] Field of Search ................. 244/12.40, 12.6, 244/34 R, 34 A, 56, 66, 23 B, 12.3

[56] References Cited

U.S. PATENT DOCUMENTS

| | | | |
|---|---|---|---|
| Re. 19,932 | 4/1936 | Bolas | 244/12.6 X |
| D. 180,019 | 4/1957 | Hedges | 244/12.6 X |
| 1,714,416 | 5/1929 | Cannistra | 244/101 |
| 2,257,940 | 10/1941 | Dornier | 244/53 R |
| 2,384,296 | 9/1945 | Gluhareff | 244/56 |
| 2,424,556 | 7/1947 | Custer | 244/12.6 X |
| 2,437,684 | 3/1948 | Custer | 244/12.6 |
| 2,510,959 | 6/1950 | Custer | 244/12.6 |
| 2,532,482 | 12/1950 | Custer | 244/12.6 |
| 2,691,494 | 10/1954 | Custer | 244/12.6 |
| 2,937,823 | 5/1960 | Fletcher | 244/12.6 |
| 2,954,943 | 10/1960 | De Lagabbe | 244/66 X |
| 3,123,321 | 3/1964 | Custer | 244/12.6 |
| 3,203,649 | 8/1965 | Girard | 244/201 |
| 3,273,827 | 9/1966 | Girard | 244/201 |
| 3,329,376 | 7/1967 | Sullivan | 244/12.4 |
| 4,709,879 | 12/1987 | Stafford | 244/56 |
| 4,726,546 | 2/1988 | De Angelis | 244/12.6 |
| 5,082,204 | 1/1992 | Croston | 244/12.6 |

Primary Examiner—Christopher P. Ellis
Attorney, Agent, or Firm—Lane, Aitken & McCann

[57] ABSTRACT

A vertical take-off and landing aircraft has an upwardly-open U-shaped channel extending from a front edge to a rear edge of each of two fixed wings and a thrust providing device, such as a propeller, mounted for tilting at the rear end of the channel. The thrust providing device has an inlet at which low pressure is produced by drawing in air along a path and the thrust providing device is tilted to vary the angle of the air drawing-in path relative to the wing and effect vertical take-off and landing by variably enhancing the lift of the wing.

15 Claims, 6 Drawing Sheets

VERTICAL TAKE-OFF AND LANDING AIRCRAFT

BACKGROUND OF THE INVENTION

The present invention relates to vertical take-off and landing aircraft and, more particularly, to vertical take-off and landing aircraft employing a channel wing and sources of thrust positioned at the trailing ends of the channels in the wing.

Vertical lift aircraft employing a channel wing and propellers at the rearward ends of the wing channels are known. For example, U.S. Pat. No. 2,437,684 to Custer discloses a vertical lift aircraft with a pusher type propeller at the rearward end of each wing channel. To achieve vertical lift, the wing is tilted relative to the propellers, the propellers remaining in fixed positions. The wing is tilted about its rearward end so that the lower edge of the locus of rotation of the tips of each propeller remains at a fixed distance relative to the rearward edge of its associated wing channel extends below the rear end of the wing at the wing channels.

U.S. Pat. No. 2,937,823 to Fletcher discloses a vertical rising take-off aircraft employing pusher propellers combined with U-shaped channels in a wing. Each U-shaped channel and its associated propeller are tilted as a unit to achieve vertical take-off, the channels and propellers tilting downward from front to back so that the thrust is directed downwardly and rearwardly to achieve vertical take-off lift.

SUMMARY OF THE INVENTION

By the present invention, an aircraft and its power plants are configured to provide vertical take-off and landing capabilities due to a great increase in the effectiveness of a low pressure area in an airfoil section of a channel wing caused by a tilt or change of angle of the thrust line. This application of the low pressure area which exists in front of a propeller disc, which is an imaginary disc defined by the rotation of the propellers, or at the inlet of a jet or turbine engine, upon the upper or lift-producing surface of the airfoil results in an increase in the lift force of 100% or more.

This application of lower pressure is achieved, in the case of a propeller, by controlling the tilting or swinging of the engine driving the propeller so that the lowest point of arc of the propeller tip remains at a fixed distance from the trailing edge of the channel wing. This critical point of the arc of the propeller tip is just within the trailing edge of the wing. The tip of the propeller, or the plane of the propeller, is enclosed by the wing and is just inside, approximately one-half inch inside, the trailing edge of the wing. As the thrust line is inclined so that the thrust is directed more upwardly, there is a resulting increase in the low pressure in front of the propeller and on the upper surface of the airfoil. This increases the lift. As a result, the aircraft can be flown at speeds varying from cruising speed at a normal thrust line to nearly zero air speed when the inclination of the thrust line produces maximum low pressure and lift. Since it is necessary that the arc of the propeller not be allowed to move beyond the rearward edge of the wing, a mechanism is employed which permits the tilting of the arc of the propeller and, thus, the tilting of the thrust line without allowing the arc to extend beyond the rear edge of the wing.

One such mechanism is a cam employing an arcuate slot whose lowest point is just within the trailing edge of the wing. The engine powering the propeller can be moved along the arcuate slot by a hydraulic power unit connected at one end to a casing of the engine and anchored at the other end to a cross spar or brace of the wing. As an alternative, the engine can be moved by electric or hydraulic motors driving gears which engage teeth in the arcuate slot. A simpler swivel or turning mechanism can be used for aircraft having turbine or jet engines.

DETAILED DESCRIPTION OF THE PREFERRED EMBODIMENTS

Figure 1:
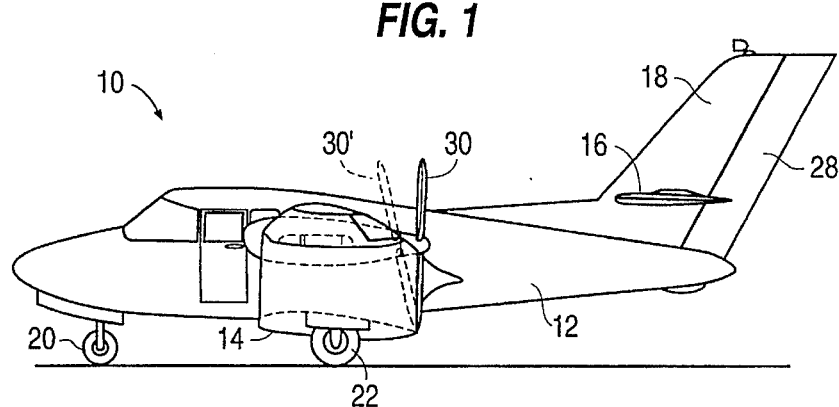
FIG. 1 is a side elevation of a vertical take-off and landing aircraft according to the present invention.
Figure 2:
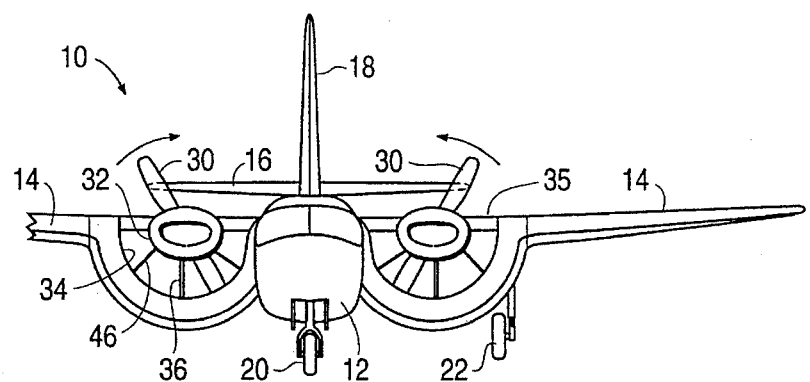
FIG. 2 is a partial front view of the aircraft of FIG. 1, showing a first embodiment of engine tilting arrangement.
Figure 3:
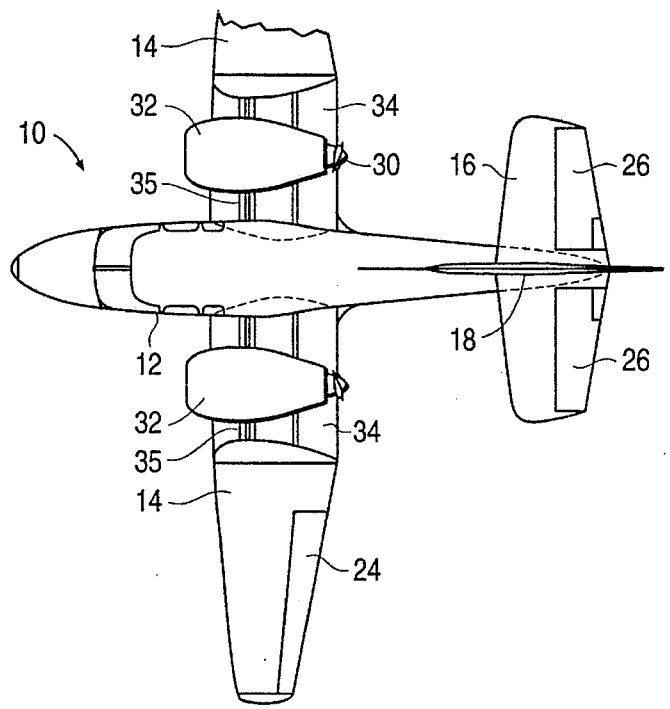
FIG. 3 is a plan view of an aircraft according to the present invention, showing a second embodiment of engine tilting arrangement.

As can be seen from FIGS. 1–3, the vertical take-off and landing aircraft according to the present invention, which is designated generally by the reference numeral 10, includes a fuselage 12, fixed wings 14, horizontal stabilizers 16, a vertical stabilizer 18, landing gear 20 and 22, appropriate control surfaces 24, 26 and 28, and a thrust providing device, which in the illustrated embodiment comprises propellers 30 driven by engines inside cowlings 32. The wings 14 each define an upwardly open U-shaped channel 34 extending from the front to the back of the wing on each side of the fuselage 12. Main spars 35 of the wings 14 extend across the U-shaped channels 34. The horizontal portions of the U-shaped channels 34 define airfoils. One of the engines is mounted in its cowling 32 along a longitudinal axis defined by the center of curvature of each U-shaped channel 34. The propeller 30 is mounted at the back of the engine, with the locus of the rotation of the tips of the propeller defining an arc whose lower edge is just forward of the rear edge of the wing 14 at the channel 34. The tips of the propeller 30 are, or the plane of the propeller is, enclosed by the wing 14, being just inside, approximately one-half inch inside, the rear edge of the wing.

Due to the action of the rotating propeller 30 in drawing in air in a certain direction, there is a low pressure area at the inlet side of the propeller, in front of the disc defined by the rotating propeller. Due to the position of the propeller 30, the low pressure area exerts an influence on the upper surface of the wing 14 in the channel and decreases the pressure on the upper surface, thereby increasing the lift. The pressure-decreasing influence of the propeller 30 can be increased by tilting the propeller downward toward the upper surface of the wing 14 in the channel 34, and thereby tilting the path along which air is drawn in by the propeller. A forward tilted position of the propeller 30 is shown by the phantom lines 30' in FIG. 1. When the propeller 30 is tilted forward to its greatest lift-enhancing position, the lift of the wing 14 can be increased by 100% or more, and the aircraft 10 can be flown at an airspeed near zero. Presently, it is expected that the maximum angle of tilt of the engine and the propeller 30 from a normal thrust line will be about 17°. However, flight testing may lead to some change in this maximum angle.

Figure 4:
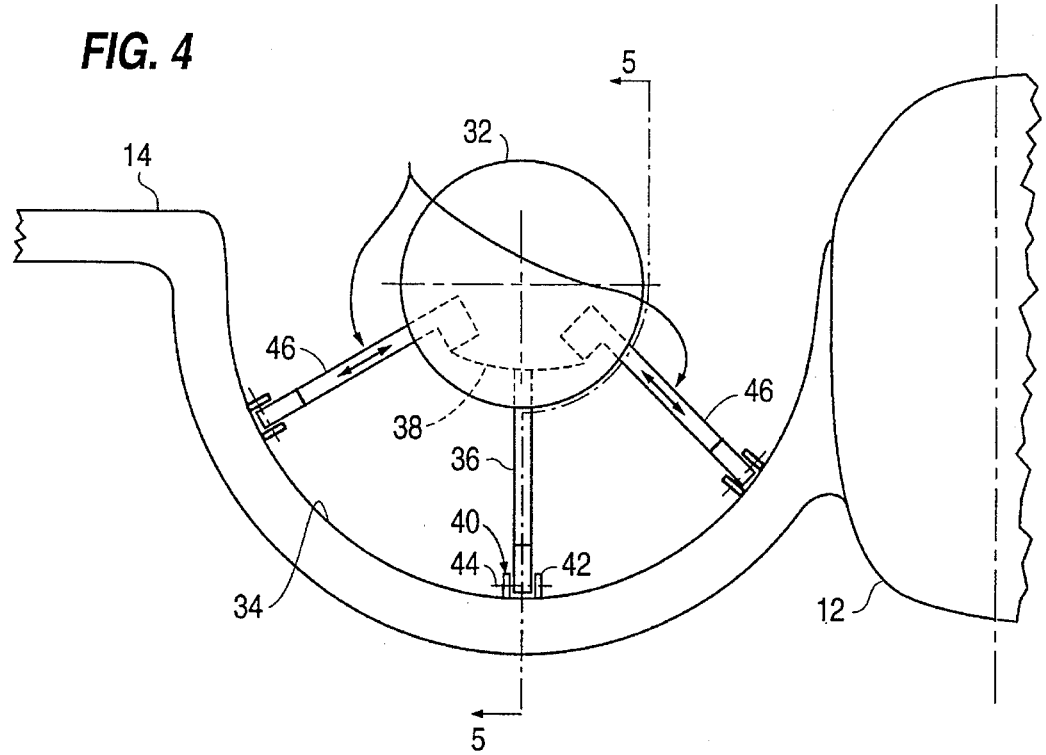
FIG. 4 is an enlarged front view of one of the engines and wing channels of the aircraft of FIG. 2.
Figure 5:
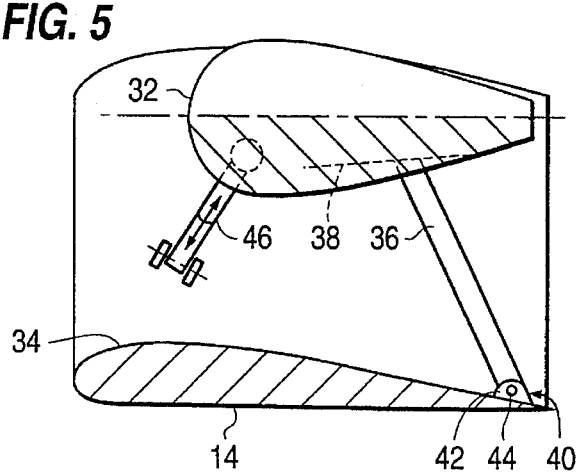
FIG. 5 is a cross section taken along the line 5—5 in FIG. 4, with the engine shown schematically.

In accordance with the present invention, arrangements are provided for tilting the engine and the propeller 30 forward while maintaining the lowest point in the arc or disc defined by the tips of the rotating propeller 30 at a constant position just inside the trailing edge of the wing 14. The engine and the propeller 30 are pivoted about a line tangent to the bottom of the circle defined by the tips of the rotating propeller 30. As can be seen from FIGS. 2, 4 and 5, one tilting arrangement includes a strut 36 having one end fixed to a mounting bed 38 on which the engine is fixed inside the cowling 32 and an opposite end attached by a pivotal connection 40 to the upper surface of the channel 34 at the trailing end of the channel. The pivotal connection 40 includes spaced flanges 42 having aligned apertures, the flanges being secured to the channel 34, and a pivot pin 44 extending through the aligned apertures, as well as through an opening in the end of the strut 36, which is received between the flanges 42. Linear actuators 46, such as hydraulic cylinders, are connected between the mounting bed 38 for the engine and the upper surface of a channel 34 to move the engine and the propeller 30 to a desired thrust angle and maintain them at the desired angle. In the embodiment illustrated in FIGS. 4 and 5, two linear actuators 46 extend between the engine mounting bed 38 and the U-shaped channel 34, extending radially from the cowling, on opposite sides of the strut 36 at an acute angle to the strut.

Figure 7:
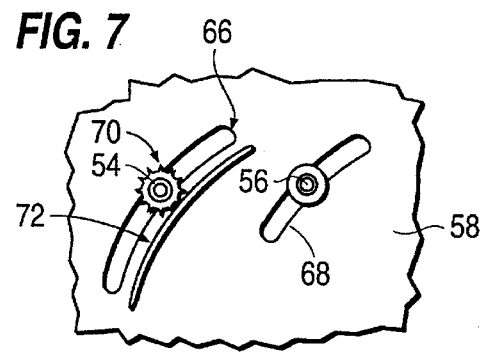
FIG. 7 is a cross section taken along the line 7—7 in FIG. 6, showing a portion of a cam plate.
Figure 6:
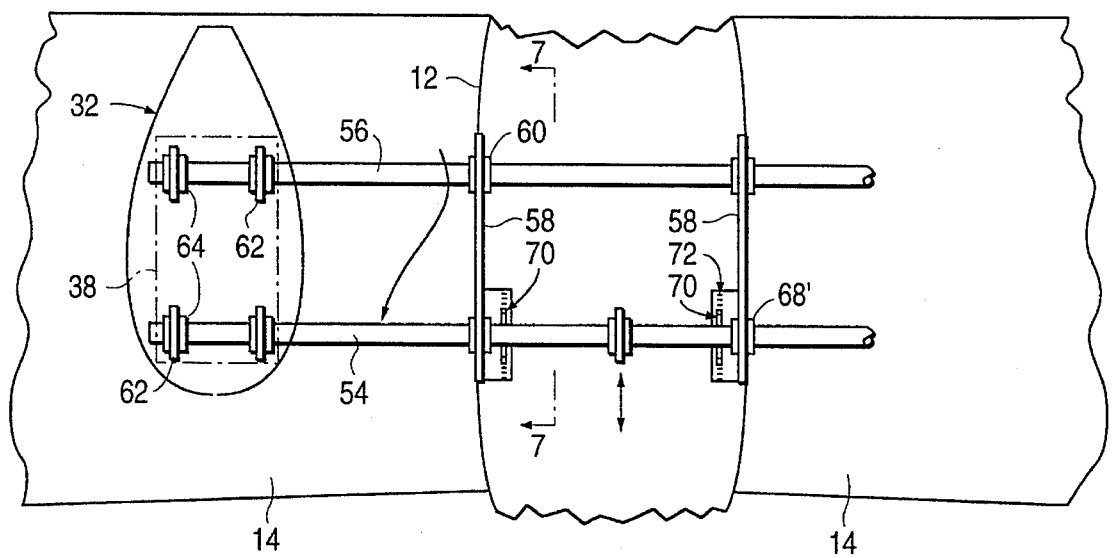
FIG. 6 is a partial plan view of the vertical take-off and landing aircraft according to the present invention, showing a third embodiment of engine tilting arrangement.
Figure 8:
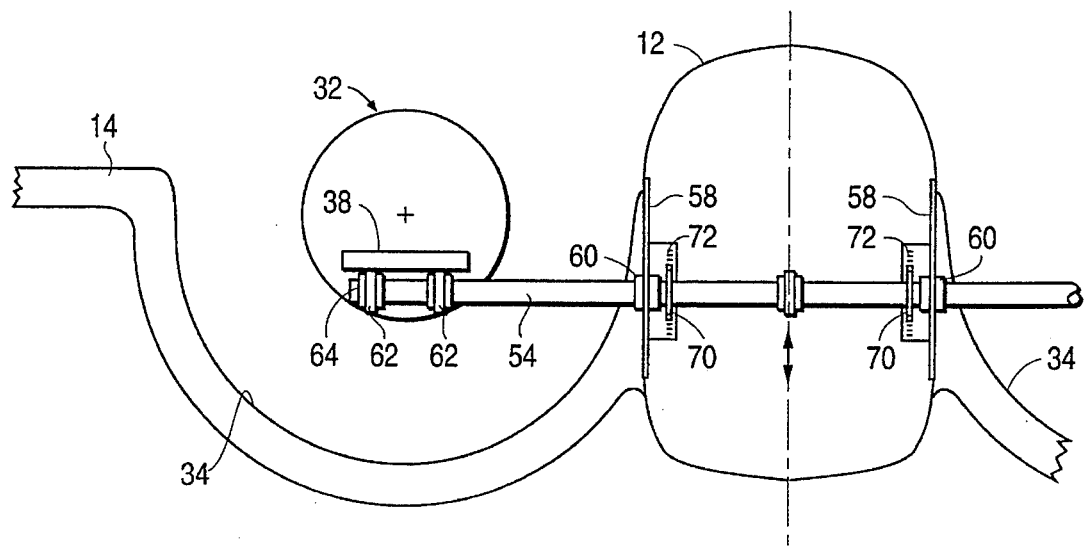
FIG. 8 is a front view of the engine tilting arrangement of FIG. 6.

As can be seen from FIGS. 6–8, an alternate arrangement for tilting the engine and the propeller 30 includes two rotating shafts 54 and 56 journalled in a cam plate 58 mounted on an interior surface of the fuselage 12, such as in nylon bushings 60. The rotating shafts 54, 56 extend through the fuselage 12, the cowling 32 of the engine, and journal members 62 secured to the underside of the engine mounting bed 38. Bearing devices, such as nylon bushings 64, are interposed between the rotating shafts 54, 56 and the journal members 62 to journal the shafts for rotation within journal members. The cam plate 58 is made of, for example, aluminum, and defines curved cam slots 66 and 68. The curved cam slots 66, 68 are concentric, with the line tangent to the bottom of the circle defined by the tips of the rotating propeller 30 being at the center of the circles on which the cam slots 66, 68 lie. The nylon bushing 60 receiving the forward shaft 54 is fixed to the forward shaft, so that the bushing and the forward shaft turn together. A gear or a sprocket 70 projects radially from the shaft 54, adjacent to the bushing 60, to engage and follow the forward curved cam slot 66 in the cam plate 58. Curved cam slots (not shown) coextensive with the curved cam slots 66 and 68 are defined in the fuselage 12, next to the cam slots in the cam plate 58. A curved rack, in the case of a gear on the shaft 54, or a curved segment of a sprocket chain 72, in the case of a sprocket 70 on the shaft 54, is mounted on the cam plate 58 parallel to the cam slot 66, the gear or sprocket 70 engaging the rack or sprocket chain segment 72 for positively moving the forward shaft 54 in the slot 66 and retaining the shaft at a desired position.

The forward cam slot 66 is longer than the rear cam slot 68, but the central angles they subtend are equal. As a result, the rotatable shafts 54 and 56 move in coordination in their respective slots such that the engines and propellers 30 tilt together about the line tangent to the circle defined by the tips of the propellers 30.

Each shaft 54, 56 can extend from the mounting bed 38 of one engine, through the cowling 32 and the fuselage 12, to the engine mounting bed 38 on the opposite side of the fuselage, so that each shaft can support both engines. The structure described above for one engine is also present on the opposite side of the center line of the aircraft 10 for the other engine. For example, an engine mounting bed, journal members, cam slots, sprocket or gear, etc., are duplicated on the right side of the aircraft, as shown in FIG. 6.

Figure 9:
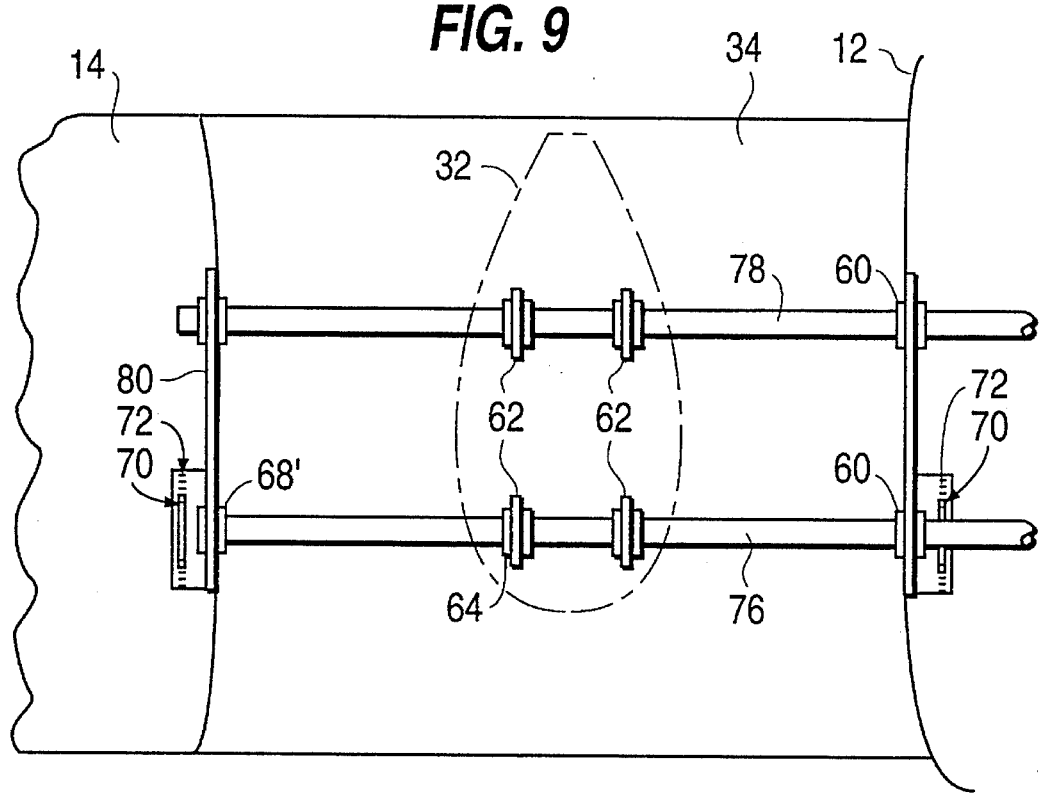
FIG. 9 is an enlarged fragmentary horizontal cross section through the vertical take-off and landing aircraft of FIG. 3, showing the second embodiment of engine tilting arrangement, the engine being shown in phantom.
Figure 10:
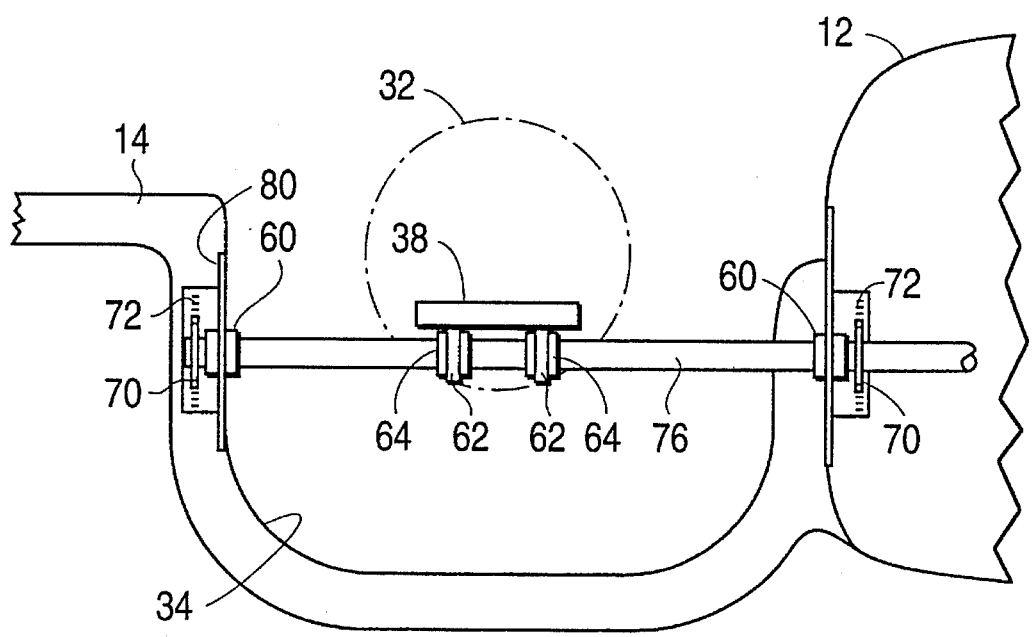
FIG. 10 is an enlarged fragmentary vertical cross section through the vertical take-off and landing aircraft of FIG. 3, showing the second embodiment of engine tilting arrangement.

As can be seen from FIGS. 3, 9 and 10, another arrangement for tilting the engine and propeller of the vertical take off and landing aircraft according to the present invention is similar to the arrangement of FIGS. 6–8, except that the shafts 76, 78 extend beyond the mounting beds 38 of the engines to supporting arrangements on the wings 14, on the opposite sides of the channels 34 from the fuselage 12. Cam plates 58 are mounted on the inside of the fuselage, as with the embodiment of FIGS. 6–8. In addition, cam plates 80 are mounted in the wings 14, on the opposite sides of the U-shaped channels 34 from the fuselage 12. Arcuate slots corresponding to the slots 66, 68 defined in the cam plates 58 inside the fuselage and to the slots defined in the fuselage itself are formed in the cam plates 80 and in the surfaces of the wings 14 defining the opposite sides of the U-shaped channels 34. The rear rotatable shaft 78 extends past each engine to a sliding nylon bushing 60 received in a curved slot defined in the aluminum cam plate 80 in each wing 14. A gear or a sprocket 70 is fixed to the forward shaft 76 adjacent to the cam plate 80, the gear or sprocket 70 engaging a curved rack or sprocket chain segment 72 mounted on the cam plate 58 inside the wing and adjacent to and parallel to the forward slot 66. In the embodiments of FIGS. 4–10, spars do not extend across the tops of the U-shaped channels 34, but instead are integrated with the U-shaped channels in a fully cantilevered wing configuration.

As yet another embodiment, the engines can be supported by cam plates, as in the embodiments of FIGS. 6–8 and FIGS. 3, 9 and 10, but the cam plates are positioned within the cowlings 32 of the engines and rigidly supported by wing spars, such as the main spars 35 of FIGS. 2 and 3, extending into the channels 34 from opposite sides. In such an embodiment, the forward and rear rotatable shafts are merely journalled for rotation inside the fuselage 12, and no curved slots are provided in the fuselage or in cam plates inside the fuselage.

Figure 11:
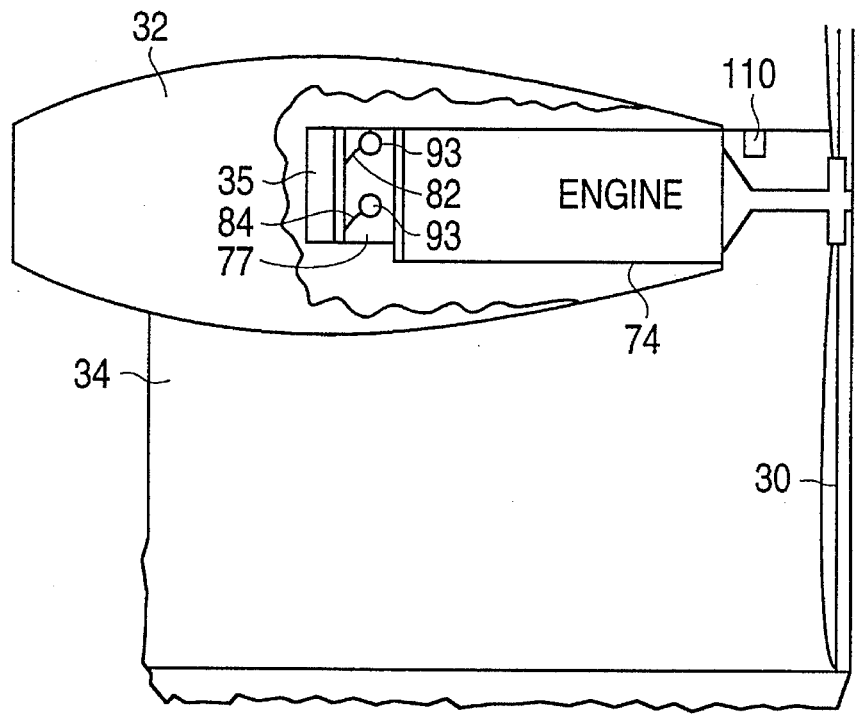
FIG. 11 is a schematic side view of a fourth embodiment of engine tilting arrangement according to the present invention.
Figure 12:
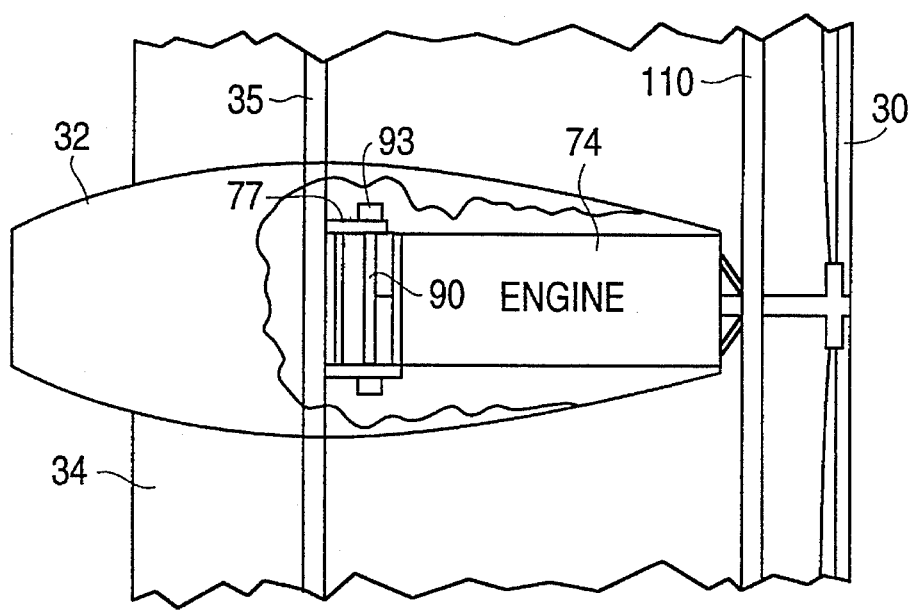
FIG. 12 is a top schematic view of the engine tilting arrangement of FIG. 11.
Figure 13:
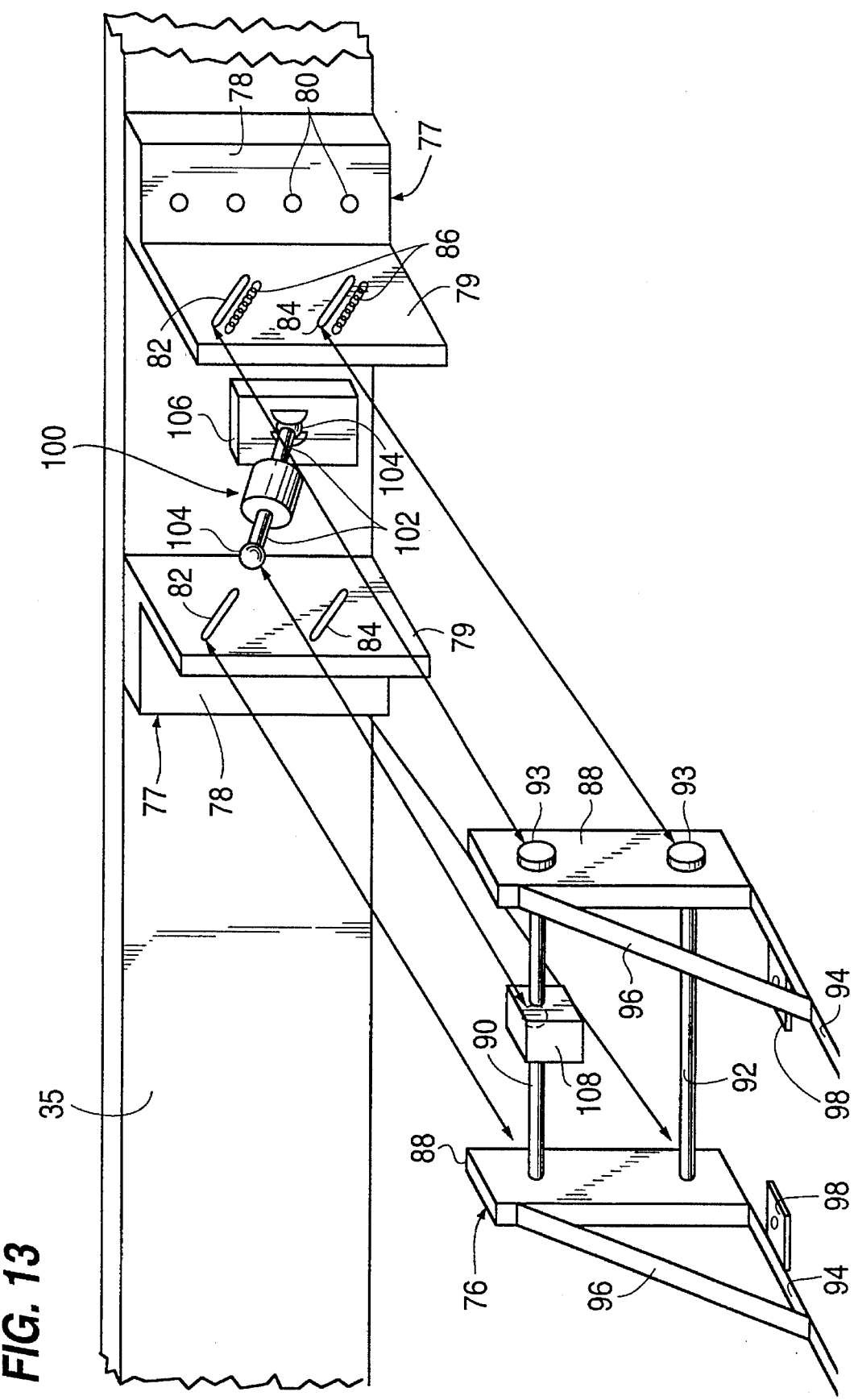
FIG. 13 is a schematic perspective view of the engine tilting arrangement of FIG. 11 with the engine and propeller removed.

A still further embodiment of engine tilting arrangement according to the present invention can be seen from FIGS. 11–13. In this arrangement, the main spar 35 extends across the top of the U-shaped channel 34, and the engine 74 is mounted on an engine mount 76 supported by the main spar 35. The engine mount 76 is connected to the main spar 35 by a pair of angle members 77, each of which has a vertical orientation, a first leg 78 secured to the rear side of the main spar 35 by fasteners 80 or the like, and a second leg 79 projecting rearward from the first leg. Each second leg 79 defines curved cam slots 82 and 84 like the curved cam slots 66 and 68 of FIG. 7. Similar to the arrangement of FIG. 7, a sprocket chain segment 86 or a curved rack is mounted on the second leg 79 parallel to the cam slot 82 on the side of the second leg facing outward from the engine mount 76. The engine mount 76 includes a pair of upright members 88 through which rotating shafts 90 and 92 pass to allow rotation. The rotating shafts 90 and 92 are extended beyond the upright members 88 and are journalled at both ends in the slots 82, 84 by nylon bushings 93 like the nylon bushings 60 of FIGS. 6 and 8. The curved cam slots 82, 84 are concentric, with the line tangent to the bottom of the circle defined by the tips of the rotating propeller 30 being at the center of the circles on which the cam slots 82, 84 lie. The bushing 93 receiving rotating shaft 90 is fixed to the shaft, so that the bushing and the shaft 90 turn together. A gear or a sprocket projects radially from the shaft 90, adjacent to the bushing, to engage and follow the curved cam slot 82, in the manner of the bushing 60 in the curved cam slot 66 in the embodiment of FIGS. 6–8. The gear or sprocket engages the rack or sprocket chain segment 86. Horizontal members 94 extend rearwardly from the bottom ends of the upright members 88, and braces 96 are secured between the horizontal members 94 and the upper ends of the uprights 88. Apertured plates 98 project inward from the horizontal members so that the engine 74 can be secured to the engine mount 76.

The engine 76 and the propeller 30 are moved among a normal thrust line position and tilting positions and are maintained in a desired position by a drive member 100. The drive member 100 can be, for example, a pressure fluid cylinder, such as a hydraulic cylinder, or a conventional worm gear drive mechanism. Rods 102 having the ball portions 104 of ball joints extend from opposite ends of the drive member 100. One of the ball portions 104 is connected to a socket 106 mounted on the rear side of the main spar 35. The other ball portion 104 is connected to a socket 108 mounted for pivoting movement on the rotating shaft 90. Where the drive member 100 is a pressure fluid cylinder, the rod 102 at one end can be an extension of the piston rod, and the rod 102 at the opposite end can be connected to the end of the cylinder.

A rear spar 110 is shown in FIGS. 11 and 12. Fairings can be placed around the main spar 35 and the rear spar 110 to produce smooth outlines and to reduce drag or air resistance. In addition, enlarged openings can be provided in the cowlings 32 where the main spars 35 pass through the cowlings to allow for relative movement between the cowlings and the main spars when the cowlings are tilted with the engines 74 and the propellers 30. Similar enlarged cowling openings can be employed in the other embodiments where the spars pass through the cowlings.

It will be apparent to those skilled in the art and it is contemplated that variations and/or changes in the embodiments illustrated and described herein may be made without departure from the present invention. For example, the illustrated embodiment involved propellers, but it is apparent that jet or turbine engines could be used in the present invention. Accordingly, it is intended that the foregoing description is illustrative only, not limiting, and that the true spirit and scope of the present invention will be determined by the appended claims.

I claim:

1. Apparatus for providing vertical take-off and landing capability for an aircraft having a fuselage and fixed wings each defining a front edge and a rear edge, comprising:

an upwardly-open channel extending from the front edge to the rear edge of each of the wings;

for each wing, a thrust-providing device having an inlet side at which the thrust providing device produces low pressure, said thrust-providing device drawing air in along a path, said inlet side being positioned within said channel and above said wing at the rear edge of said wing, and means for mounting said thrust-providing device on the aircraft for tilting movement relative to the wing, whereby the air drawing-in path of the thrust-providing device is tiltable relative to an upper surface of the wing to enhance the lift of the wing, wherein the thrust-providing device is a propeller driven by an engine, the propeller includes blades having tips which define a circle as the propeller rotates, and said mounting means comprises means for mounting said engine on the aircraft such that said propeller tilts about a line tangent to the bottom of said circle.

2. The apparatus of claim 1, wherein said tangent line is closely spaced above the wing just forward of the rear edge of the wing.

3. The apparatus of claim 1, wherein said mounting means comprises means for tilting the air drawing-in path of said thrust-providing device relative to the wing.

4. The apparatus of claim 1, wherein said propeller is positioned rearward of said engine.

5. The apparatus of claim 1, wherein said mounting means comprises a strut having a first end fixed to the engine and a second end pivotally connected to the wing, and means for moving said engine and said strut about said second end of said strut.

6. The apparatus of claim 5, wherein said moving means comprises at least one linear actuator.

7. The apparatus of claim 1, wherein said mounting means comprises two shafts extending from the fuselage to the engine, means for supporting said shafts for rotation, said supporting means comprising a cam plate fixed to the aircraft, and curved slots defined in said cam plate, said shafts extending through said curved slots.

8. The apparatus of claim 7, further comprising a bushing fixed to each of said shafts, said bushings received in said curved slots, a sprocket fixed to one of said shafts adjacent to said cam plate, and a sprocket chain affixed to said cam plate adjacent to the curved slot receiving the rotatable shaft having said sprocket, said sprocket chain being fixed in a curve parallel to the curved slot receiving the rotatable shaft having said sprocket, said sprocket engaging said sprocket chain.

9. The apparatus of claim 7, further comprising a bushing fixed to each of said shafts, said bushings received in said curved slots, a gear fixed to one of said shafts, and a rack affixed to the aircraft adjacent to the curved slot receiving the rotatable shaft having said gear, said rack being fixed in a curve parallel to the curved slot receiving the rotatable shaft having said gear, said gear engaging said rack.

10. The apparatus of claim 7, wherein said cam plates are fixed to the fuselage.

11. The apparatus of claim 7, wherein said cam plates are fixed to the wings.

12. The apparatus of claim 1, wherein the wing has a spar extending across said channel, and said mounting means comprises means for mounting said engine on said spar.

13. The apparatus of claim 12, wherein said mounting means comprises members secured to said spar, an engine mount, two shafts extending from the engine mount to the members on the spar, means for supporting said shafts for rotation, and curved slots defined in said members on said spar, said shafts extending through said curved slots.

14. The apparatus of claim 13, further comprising means for moving said engine mount relative to said members on said spar.

15. A vertical take-off and landing aircraft, comprising:

a fuselage;

fixed wings each defining a front edge, a rear edge, and an upwardly open channel extending from the front edge to the rear edge of each of the wings, for each wing, a thrust-providing device having an inlet side at which the thrust-providing device produces low pressure, said thrust-providing device drawing air in along a path, said inlet side being positioned within said channel and above said wing at the rear edge of said wing; and means for mounting said thrust-providing device on the aircraft for tilting movement relative to the wing, whereby the air drawing-in path of the thrust-providing device is tiltable relative to an upper surface of the wing to enhance the lift of the wing, wherein the thrust-providing device is a propeller driven by an engine, the propeller includes blades having tips which define a circle as the propeller rotates, and said mounting means comprises means for mounting said engine on the aircraft such that said propeller tilts about a line tangent to the bottom of said circle.

* * * * *